United States Patent [19]

Powell

[11] Patent Number: 5,074,376
[45] Date of Patent: Dec. 24, 1991

[54] NOISE REDUCTION METHOD

[75] Inventor: Ronald L. Powell, Hants, Great Britain

[73] Assignee: The Marconi Company Limited, England

[21] Appl. No.: 451,095

[22] Filed: Dec. 15, 1989

[30] Foreign Application Priority Data

Dec. 21, 1988 [GB] United Kingdom ............ 8829792.4

[51] Int. Cl.⁵ .............................................. F01N 1/16
[52] U.S. Cl. ................................... 181/277; 181/296; 416/228
[58] Field of Search ...................... 181/277, 296, 278; 415/119; 416/223 R, 228

[56] References Cited

U.S. PATENT DOCUMENTS

| | | | |
|---|---|---|---|
| 3,779,338 | 12/1973 | Hayden et al. | 181/296 |
| 4,089,618 | 5/1978 | Patel | 416/228 |
| 4,274,806 | 6/1981 | Gallardo, Jr. | 416/228 X |
| 4,370,097 | 1/1983 | Hanson et al. | 416/228 |

FOREIGN PATENT DOCUMENTS

| | | |
|---|---|---|
| 0244334 | 11/1987 | European Pat. Off. . |
| 0273851 | 7/1988 | European Pat. Off. . |
| 93910 | 12/1896 | Fed. Rep. of Germany . |
| 905700 | 4/1945 | France . |
| 109150 | 9/1917 | United Kingdom . |
| 206880 | 11/1923 | United Kingdom . |
| 293656 | 7/1928 | United Kingdom . |
| 718498 | 11/1954 | United Kingdom . |
| 1478069 | 6/1977 | United Kingdom . |

Primary Examiner—Brian W. Brown
Attorney, Agent, or Firm—Kirschstein, Ottinger, Israel & Schiffmiller

[57] ABSTRACT

When there is relative movement, at a speed above a critical value, between the trailing edge of a body, such as a hydrofoil or aerofoil section, and a fluid, the fluid flow tends to form a pattern of discrete swirling vortices. Vortex shedding at each side of the trailing edge alternately can cause resonance or "singing" of the section. The effect of this phenomenon is reduced by forming contiguous triangular flat-faced notches in the major surfaces of the section, adjacent the trailing edge, but leaving the profile of the leading edge substantially undistrubed. The notches in one major surface are preferably staggered relative to those in the other major surface.

16 Claims, 1 Drawing Sheet

NOISE REDUCTION METHOD

BACKGROUND OF THE INVENTION

Field of the Invention

This invention relates to a method of reducing noise which is produced by a hydrofoil or aerofoil surface, such as the surface of a propeller blade, caused by relative movement between the surface and water or air or other fluid.

SUMMARY OF THE INVENTION

It is known that when there is relative movement, at a speed above a certain critical value, between the trailing edge of a body, such as a hydrofoil, and a fluid, the fluid flow tends to form a pattern of discrete swirling vortices.

The phenomenon of vortex shedding, in which vortices are shed from each side of the edge alternately, causes periodic forces to be applied to the body. If the frequency of these forces coincides with a natural frequency of the body, resonance occurs. This form of excitation of the body can have considerable acoustic energy, which can be heard as "singing" of the body.

This phenomenon can also occur in relation to rotors and stators of propulsors of the pump jet type, and any other hydrofoil or aerofoil type of surface which is subjected to fluid flow.

On large structures, such as the propellers of large ships, prevention or reduction of singing can be effected by machining a simple bevel on to the trailing edge of each blade. However, the results are variable and this solution to the problem is difficult or even impossible to achieve on small blades, because of the thinness of the trailing edge.

It is an object of the present invention to provide an improved and more reliable method of reducing the singing of hydrofoil or aerofoil sections.

According to one aspect of invention there is provided a method of reducing noise caused by vibration of a hydrofoil or aerofoil section due to relative movement between the section and a fluid, the section having first and second major surfaces interconnected by a trailing edge of the section, the method comprising forming a plurality of contiguous triangular flat-faced notches in at least one of said major surfaces and disposed along at least a part of the respective surface adjacent the trailing edge, leaving the profile of said trailing edge substantially undisturbed by the notches.

According to another aspect of the invention there is provided a hydrofoil or aerofoil section comprising first and second major surfaces interconnected by a trailing edge of the section; and a plurality of contiguous triangular flat-faced notches in at least one of said major surfaces and disposed along at least part of the respective surface adjacent the trailing edge, the profile of said trailing edge being substantially undisturbed by the notches.

The term "profile" herein is intended to mean the shape of the trailing edge as viewed from a side of the section.

The notches are preferably disposed in rows along both major surfaces, the notches in one surface being staggered relative to those in the other surface.

BRIEF DESCRIPTION OF THE INVENTION

An embodiment of the invention will now be described, by way of example, with reference to the accompanying drawings, in which FIG. 1 is a pictorial view of a propeller blade, and FIG. 2 is a pictorial view of a region of the blade, on an enlarged scale.

DETAILED DESCRIPTION OF THE PREFERRED EMBODIMENTS

Figure 1:
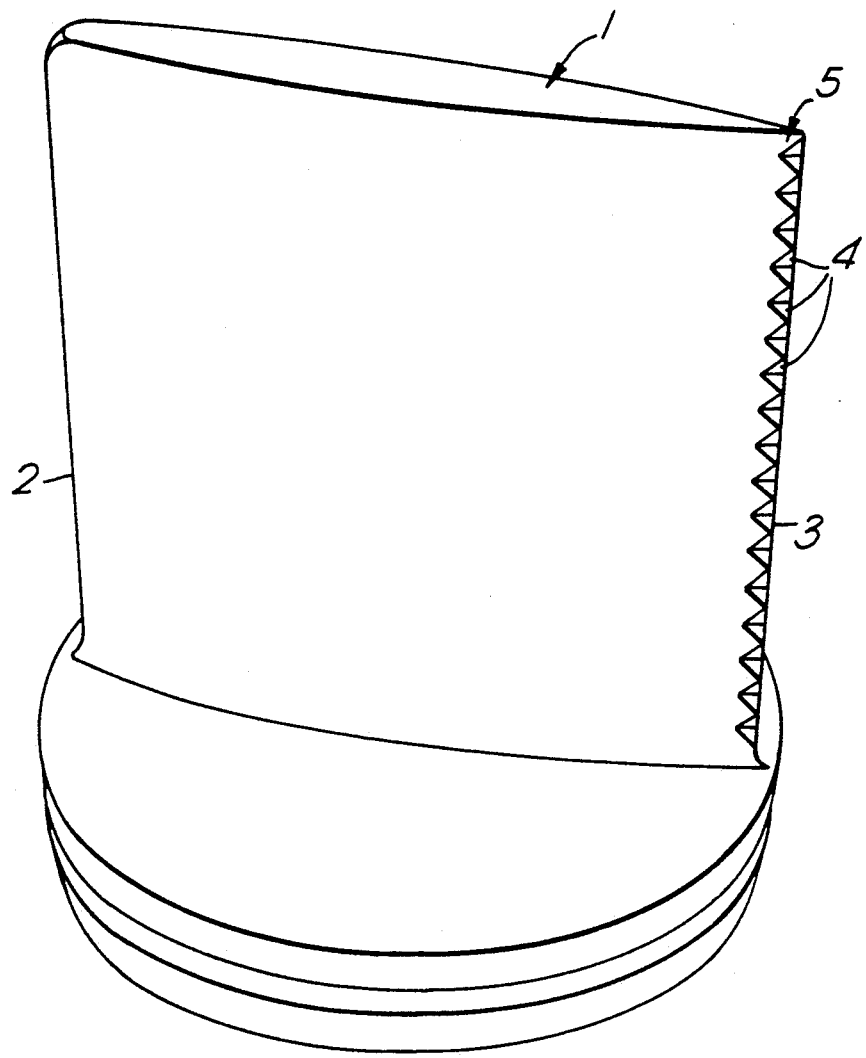

Referring to the drawings, as propeller blade 1 of hydrofoil rotates in water or other liquid, regular vortex shedding would occur at the trailing edge, giving rise to the above-mentioned "singing" phenomenon.

However, this problem is alleviated, in accordance with the invention, by providing triangular notches 4 in a row 5 along a major surface 6 of the blade, adjacent the trailing edge. A similar row 7 of triangular notches 8 is preferably also provided along the reverse surface 9 of the blade adjacent the trailing edge. The notches 4 and 8 act to break up the regular nature of the vortex shedding, and thereby reduce or prevent the singing phenomenon. On a small blade, notches extending only, say, 4mm away from the trailing edge may be suitable.

Figure 2:
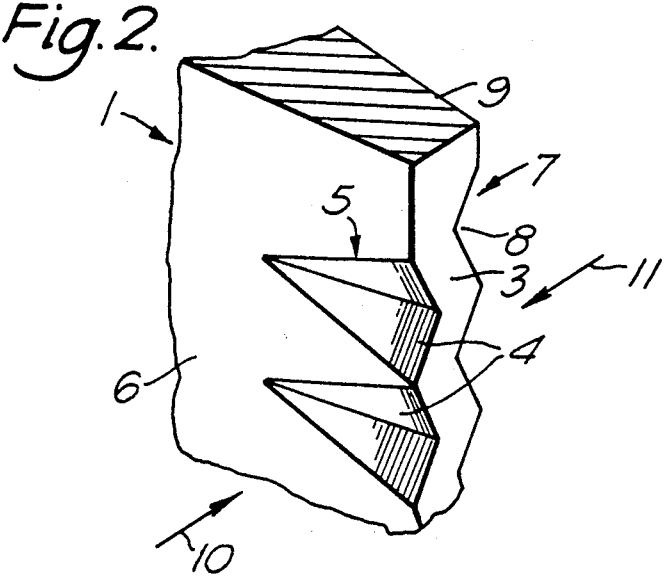

Referring particularly to FIG. 2, each notch is flat-faced, and the notches are contiguous, so that there is no flat area of surface 6 or 9 between the corners of adjacent notches. The two rows 5,7 of notches 4,8 are staggered, so that the notches in one surface 6 of the blade fall between those in the other surface 9.

It will be seen that the notches do not disturb the line or profile of the trailing edge 3, i.e. as viewed in the direction of an arrow 10 or an arrow 11.

Adequate noise reduction may in some cases be obtained by providing a row of notches along only one surface of the blade, such as the row 5 of notches 4.

Although the rows of notches are shown in FIG. 1 as extending along substantially the whole length of the blade, it may be sufficient to locate the or each row of notches along a shorter section of the trailing edge of the blade.

It will be apparent that the invention could alternatively be applied to any other hydrofoil section where singing would occur, such as the rotor or stator blades of pumps, rudders, keels or stabilisers. In fact, the same principle could be applied to the control of vibrations generated by air or gas flow across aerofoil edges. Areas of application could include gas turbine blades, helicoptor blades, cooling fans, air distribution fans and car aerofoils.

The notches may be cut in the hydrofoil or aerofoil section by a machining operation during or after formation of the section, or, in the case of a cast section, they may be formed during the casting operation.

I claim:

1. A noise-reducing hydrofoil or aerofoil section, comprising:
   (a) a pair of spaced-apart, major side surfaces, each having a length;
   (b) a smooth, continuous, trailing surface extending between the side surfaces; and
   (c) a plurality of contiguous notches arranged in a row along at least part of the length of one of the side surfaces, each notch having generally triangular, flat faces that extend from said one side surface in a direction toward, but terminating short of, the other of the side surfaces, said faces of each notch meeting at a joint spaced from said other side surface, one face of each notch being directly joined to one face of an adjacent notch.

2. The section according to claim 1, wherein the notches are arranged along the entire length of said one side surface.

3. The section according to claim 1, wherein the comprising another plurality of contiguous auxiliary notches arranged in a row along at least part of the length of said other side surface, each auxiliary notch having generally triangular, flat faces that extend from said other side surface in a direction toward, but terminating short of, said one side surface, said faces of each auxiliary notch meeting at an auxiliary joint spaced from said one side surface, one face of each auxiliary notch being directly joined to one face of an adjacent auxiliary notch.

4. The section according to claim 3, wherein the notches along said one side surface are staggered relative to the auxiliary notches along said other side surface, as considered along the lengths of the side surfaces.

5. The section according to claim 4, wherein the auxiliary notches are arranged along the entire length of said other side surface.

6. The section according to claim 1, wherein the one faces of adjacent notches have corners that are directly joined to each other.

7. The section according to claim 1, wherein the trailing surface lies generally in a plane that is free of projections extending normally of said plane.

8. The section according to claim 1, wherein the joint is linear.

9. A method of making a noise-reducing hydrofoil or aerofoil section, comprising the steps of:
   (a) forming each of a pair of spaced-apart, major, side surfaces with a length;
   (b) forming a smooth, continuous, trailing surface between the side surfaces;
   (c) arranging a plurality of contiguous notches in a row along at least part of the length of one of the side surfaces;
   (d) forming each notch with generally triangular, flat faces that extend from said one side surface in a direction toward, but terminating short of, the other of the side surfaces, said faces of each notch meeting at a joint spaced from said other side surface; and
   (e) directly joining one face of each notch to one face of an adjacent notch.

10. The method according to claim 9 wherein the arranging step is performed by arranging the notches along the entire length of said one side surface.

11. The method according to claim 9; and further comprising the steps of arranging another plurality of contiguous auxiliary notches in a row along at least one part of the length of said other side surface, and forming each auxiliary notch with generally triangular flat faces that extend from said other side surface in a direction toward, but terminating short of, said one side surface, said faces of each auxiliary notch meeting at an auxiliary joint spaced from said one side surface, and directly joining one face of each auxiliary notch to one face of an adjacent auxiliary notch.

12. The method according to claim 18; and further comprising the step of staggering the notches along said one side surface relative to the auxiliary notches along said other side surface, as considered along the lengths of the side surfaces.

13. The method according to claim 12, wherein the step of arranging the auxiliary notches is performed by arranging the auxiliary notches along the entire length of said other side surface.

14. The method according to claim 9, wherein the directly joining step is performed by joining said one faces of adjacent notches at corners.

15. The method according to claim 9, where the step of forming each notch is performed by machining.

16. The method according to claim 9, wherein the step of forming each notch is performed by casting.

* * * * *